United States Patent
Seinfeld et al.

(10) Patent No.: US 9,529,879 B2
(45) Date of Patent: Dec. 27, 2016

(54) REVERSE REPLICATION TO ROLLBACK CORRUPTED FILES

(71) Applicant: Microsoft Corporation, Redmond, WA (US)

(72) Inventors: Marc E. Seinfeld, Fort Lauderdale, FL (US); Daron Spektor, Seattle, WA (US); William M. Zintel, Woodinville, WA (US); Adrian M. Marinescu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 150 days.

(21) Appl. No.: 13/926,674

(22) Filed: Jun. 25, 2013

(65) Prior Publication Data

US 2014/0379637 A1    Dec. 25, 2014

(51) Int. Cl.
*G06F 17/30* (2006.01)
*G06F 21/56* (2013.01)

(52) U.S. Cl.
CPC ....... *G06F 17/30575* (2013.01); *G06F 21/568* (2013.01)

(58) Field of Classification Search
USPC .......................... 707/610, 626, 638, 634, 637
See application file for complete search history.

(56) References Cited

U.S. PATENT DOCUMENTS

| | | | |
|---|---|---|---|
| 7,594,272 B1 * | 9/2009 | Kennedy et al. | 726/24 |
| 7,725,940 B2 * | 5/2010 | Kobayashi | G06F 21/564 |
| | | | 707/655 |
| 7,784,098 B1 | 8/2010 | Fan et al. | |
| 8,001,603 B1 * | 8/2011 | Kennedy | 726/24 |
| 8,181,247 B1 * | 5/2012 | Pavlyushchik et al. | 726/22 |
| 8,689,043 B1 * | 4/2014 | Bezbaruah | G06F 11/2058 |
| | | | 711/162 |
| 9,122,688 B1 * | 9/2015 | Palanki | G06F 17/30076 |
| 2003/0172089 A1 | 9/2003 | Douceur et al. | |
| 2003/0220948 A1 | 11/2003 | Green et al. | |

(Continued)

OTHER PUBLICATIONS

"International Search Report & Written Opinion for PCT Patent Application No. PCT/US2014/043555", Mailed Date: Oct. 21, 2014, 8 Pages.

(Continued)

*Primary Examiner* — Cam-Linh Nguyen
(74) *Attorney, Agent, or Firm* — Timothy Churna; Kate Drakos; Micky Minhas (57) ABSTRACT

The present invention extends to methods, systems, and computer program products for reverse replication to rollback corrupted files. When a computer system detects that a copy of a file includes inappropriate content, the computer system can coordinate with other computer systems (e.g., in replicated storage system) to determine that a viable (e.g., clean) copy of the file exists. The computer system can access the viable copy and replace the copy that includes the inappropriate content with the viable copy. As such, a computer system can "reverse replicate" a file rather than break a synchronization relationship. Reverse replication can be used to rollback a copy of an infected file to another (possibly earlier) copy of the file that is not infected. Embodiments of the invention can be used to rollback data files, such as, for example, pictures, videos, documents, etc.

20 Claims, 3 Drawing Sheets

(56) References Cited

U.S. PATENT DOCUMENTS

| | | | |
|---|---|---|---|
| 2004/0237079 A1 | 11/2004 | Cox et al. | |
| 2005/0033975 A1* | 2/2005 | Lahti et al. | 713/200 |
| 2007/0180528 A1* | 8/2007 | Kane | 726/24 |
| 2007/0240217 A1* | 10/2007 | Tuvell et al. | 726/24 |
| 2007/0283438 A1* | 12/2007 | Fries et al. | 726/24 |
| 2008/0086773 A1* | 4/2008 | Tuvell et al. | 726/23 |
| 2008/0148403 A1* | 6/2008 | Manion | G06F 21/56 726/22 |
| 2009/0006744 A1* | 1/2009 | Cavallo | G06F 1/3221 711/114 |
| 2009/0038011 A1* | 2/2009 | Nadathur | 726/24 |
| 2009/0112789 A1* | 4/2009 | Oliveira | H04L 67/1095 |
| 2009/0112811 A1* | 4/2009 | Oliveira | G06F 3/067 |
| 2009/0112880 A1* | 4/2009 | Oliveira | H04L 67/1097 |
| 2009/0165136 A1* | 6/2009 | Obrecht et al. | 726/24 |
| 2010/0031361 A1* | 2/2010 | Shukla | 726/24 |
| 2010/0077481 A1 | 3/2010 | Polyakov et al. | |
| 2010/0223608 A1* | 9/2010 | DeHaan | G06F 11/1482 717/176 |
| 2010/0262584 A1* | 10/2010 | Turbin et al. | 707/674 |
| 2010/0268682 A1* | 10/2010 | Lewis et al. | 706/54 |
| 2011/0107424 A1* | 5/2011 | Singh et al. | 726/24 |
| 2011/0225128 A1* | 9/2011 | Jarrett et al. | 707/692 |
| 2012/0124007 A1* | 5/2012 | Sten et al. | 707/685 |
| 2012/0185941 A1* | 7/2012 | Jung et al. | 726/24 |
| 2012/0197844 A1* | 8/2012 | Wang | G06F 11/1464 707/646 |
| 2012/0210431 A1* | 8/2012 | Stahlberg et al. | 726/24 |
| 2012/0240183 A1 | 9/2012 | Sinha | |
| 2012/0284229 A1* | 11/2012 | Kim | H04L 67/1095 707/634 |
| 2013/0067576 A1* | 3/2013 | Niemel | 726/24 |
| 2014/0129225 A1* | 5/2014 | Nair | H04L 51/12 704/251 |

OTHER PUBLICATIONS

"Collective Intelligence", Published on: Sep. 1, 2008, Available at: http://www.pandasecurity.com/homeusers/solutions/collective-intelligence/.

Portokalidis, et al., "Paranoid Android: Zero-Day Protection for Smartphones using the Cloud", In Annual Computer Security Applications Conference, Dec. 2010, 20 pages.

"Rapid Rollback", Published on: Feb. 28, 2013, Available at: http://www.webroot.com/En_US/business/secureanywhere-endpoint/abysmal-support/rollback.

"International Preliminary Report on Patentability Issued in PCT Application No. PCT/US2014/043555", Mailed Date: Sep. 17, 2015, 7 Pages.

* cited by examiner

REVERSE REPLICATION TO ROLLBACK CORRUPTED FILES

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

In some environments, data is synchronized between different devices over a network, such as, for example, a hub and spoke network or mesh network. For example, replicated storage can be used to store data at multiple different devices. As such, an updated version of a file at one device can be propagated to other devices. Propagation can be direct or through one or more intermediary devices. Unfortunately, using networks to synchronize files, such as, replicated storage, also introduces a new spread vector for malware. For example, a virus infected file can be transferred to one device and then be propagated to one or more other devices through the synchronization process.

As such, network devices can include malware scanners that scan files for malware (viruses, worms, keyloggers, etc). However, a malware scanner or other modules at a device may have limited ability to repair an infected file after detection. It may be especially difficult, and potentially impossible, to repair data files. For example, a malware scanner cannot retake a photo or rewrite a book. Thus, when malware is detected in a file, a malware scanner often removes and/or quarantines the file. However, removal and/or quarantine of a file can orphan clean copies of the file at other devices. Alternately, a device can replicate deletion of an infected file to other devices. However, replicating deletion of a file can delete clean copies of the file at other devices.

BRIEF SUMMARY

The present invention extends to methods, systems, and computer program products for reverse replication to rollback corrupted files. A computer system detects that a copy of a file at the computer system contains inappropriate content. The computer system coordinates with the one or more replicas to determine that another copy of the file is available at a replica from among one or more replicas. The computer system receives an indication from the replica that the other copy of the file does not include inappropriate content. The computer system accesses the other copy of the file from the replica. The computer system replaces the copy of the file with the other copy of the file at the computer system.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for reverse replication to rollback corrupted files. A computer system detects that a copy of a file at the computer system contains inappropriate content. The computer system coordinates with the one or more replicas to determine that another copy of the file is available at a replica from among one or more replicas. The computer system receives an indication from the replica that the other copy of the file does not include inappropriate content. The computer system accesses the other copy of the file from the replica. The computer system replaces the copy of the file with the other copy of the file at the computer system.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

In this description and in the following claims, "synchronization" is defined as keeping multiple copies of a dataset in coherence with one another, or to maintain data integrity.

In this description and in the following claims, "replication" is defined as sharing information so as to ensure consistency between redundant resources, such as software or hardware components, to improve reliability, fault-tolerance, or accessibility.

In this description and in the following claims, "replicated storage" is defined as storage where a replica of data (such as a file) is distributed to multiple different computer systems for storage. For example, a copy of a file can be stored on a server, a home computer system, and a mobile phone. When the file is changed at one device, the changed file is propagated to the other devices. Replicated storage can be implemented in cloud storage.

In this description and in the following claims, "cloud storage" is defined as storage that uses a cloud computing model and/or that operates in a cloud computing environment. In some embodiments, a distributed storage system is implemented using cloud storage. The distributed storage system can include a plurality of storage devices and a plurality of storage servers. Different portions of data for a file can be distributed across the plurality of storage devices and accessed by the plurality of storage servers. Thus, when a client device requests a file, different portions of the file can be accessed from different storage devices (potentially in parallel) and then sent from different storage servers to the client device (potentially in parallel).

In general, embodiments of the invention use reverse replication to rollback corrupted files. When a computer system detects that a copy of a file includes inappropriate content, the computer system can coordinate with other computer systems (e.g., in replicated storage system) to determine that a viable (e.g., clean) copy of the file exists. The computer system can access the viable copy and replace the copy that includes the inappropriate content with the viable copy.

As such, a computer system can "reverse replicate" a file rather than break a synchronization relationship. Reverse replication can be used to rollback a copy of an infected file to another (possibly earlier) copy of the file that is not infected. Embodiments of the invention can be used to rollback data files, such as, for example, pictures, videos, documents, etc.

Figure 1:
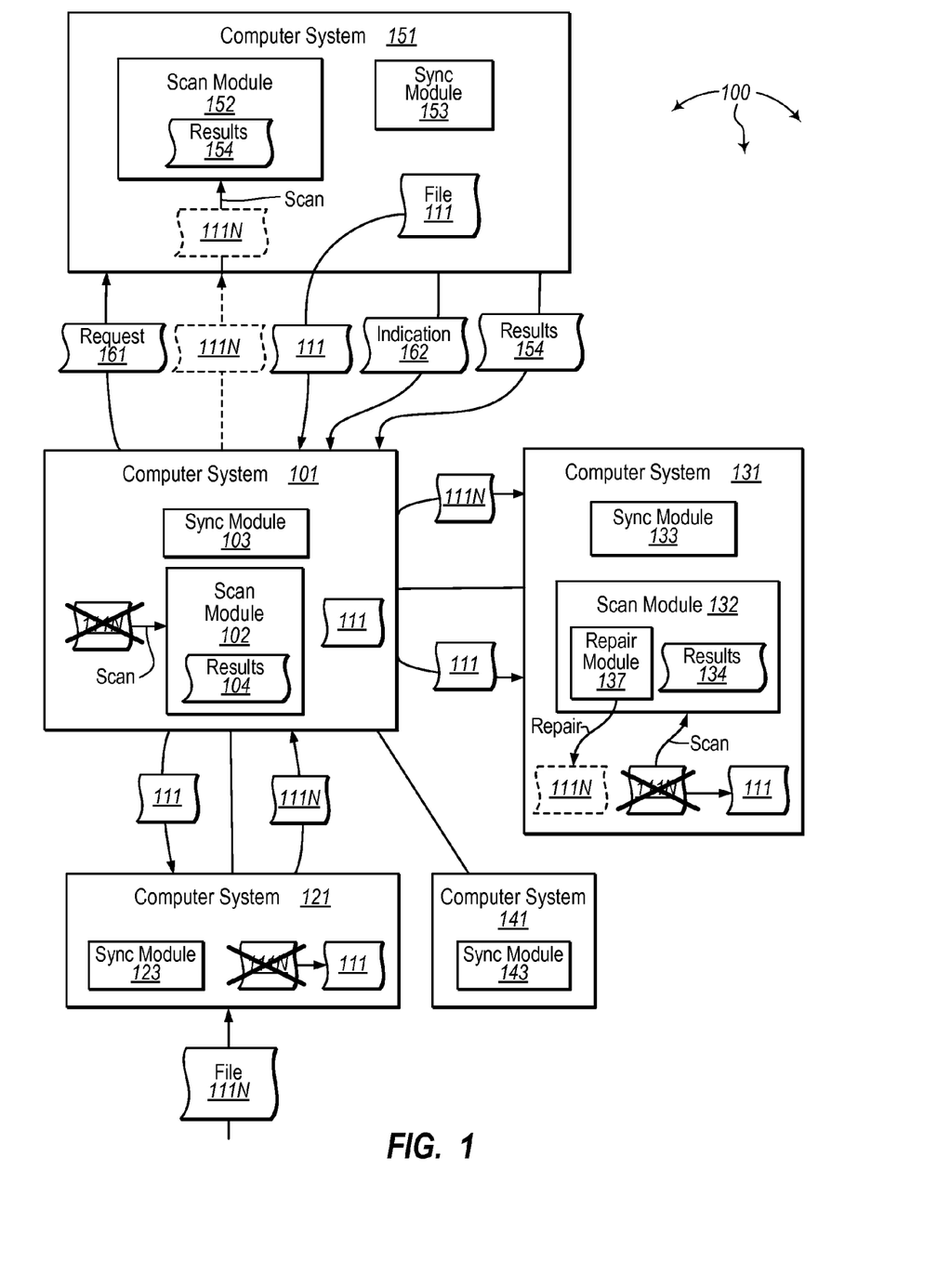
FIG. 1 illustrates an example computer architecture that facilitates reverse replication to rollback corrupted files.

FIG. 1 illustrates an example computer architecture 100 that facilitates reverse replication to rollback a file. Referring to FIG. 1, computer architecture 100 includes computer systems 101, 121, 131, 141, and 151. Each of computer systems 101, 121, 131, 141, and 151 can be connected to one another over (or be part of) a network, such as, for example, a Local Area Network ("LAN"), a Wide Area Network ("WAN"), and even the Internet. Accordingly, computer systems 101, 121, 131, 141, and 151 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc. or using other non-datagram protocols) over the network. In some embodiments, computer systems 101, 121, 131, 141, and 151 and potentially one or more other computer systems each operate replicas of a replicated storage system.

Computer systems of a replicated storage system can include sync modules used to synchronize files with other computer systems, for example, at other replicas. For example, computer systems 101, 121, 131, 141, and 151 include sync modules 103, 123, 133, 143, and 153 respectively. When a file is introduced at one computer system sync modules can coordinate (e.g., using a synchronization protocol) to propagate (e.g., replicate) the file to other computer systems. For example, when file 111N is introduced at computer system 121 (e.g., by a user), sync modules 103 and 123 can coordinate to propagate file 111N from computer system 121 to computer system 101. Sync module 103 can then coordinate with sync modules 133, 143, and 153 to propagate file 111N from computer system 101 to computer systems 131, 141, and 151 respectively.

Computer systems of a replicated storage system can also include scanning modules used to scan files for inappropriate content. For example, computer systems 101, 131, and 151 include scan modules 102, 132, and 152 respectively. When a file is accessed at a computer system, a scanning module can scan the file for inappropriate content. For example, when file 111N is propagated to computer system 101, scan module 102 can scan file 111N for inappropriate content. When inappropriate content is detected in a file, a scan module can take remediative action so that inappropriate content is not spread further. Remediative action can include deleting an infected file, repairing an infected file, initiating reverse replication for an infected file, etc. For example, if scan module 102 detects inappropriate content in file 111N, scan module 102 can take remediative action so that the detected inappropriate content in file 111N is not propagated to computer systems 131, 141, and 151.

Inappropriate content can include malicious software, such as, viruses, worms, Trojan horses, rootkits, keyloggers, adware, spyware as well as other types of malware. Thus, scanning modules can protect synchronization relationships from being and/or becoming a vector for malware. Inappropriate content can also include content that is not permitted to reach or leave a computer system. Thus, scanning modules can also protect synchronization relationships from being and/or becoming a vector for data leakage.

Figure 2:
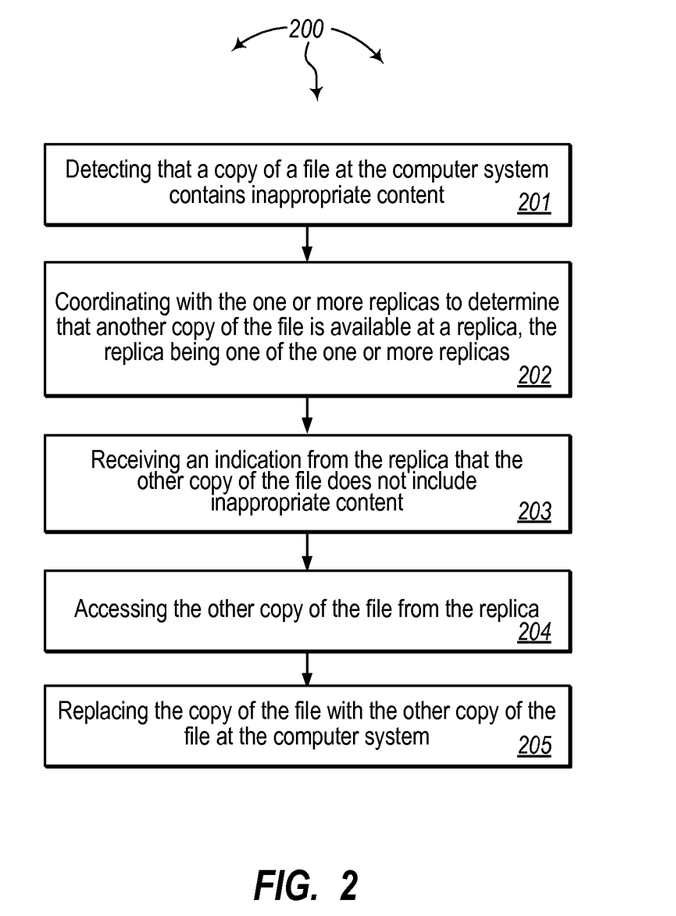
FIG. 2 illustrates a flow chart of an example method for reverse replication to rollback infected files.

FIG. 2 illustrates a flow chart of an example method 200 for reverse replication to rollback a file. Method 200 will be described with respect to the components and data of computer architecture 100.

A user at computer system 121 can enter file 111N into computer system 121. Alternately, some other device can send file 111N to computer system 121. File 111N can be a data file, such as, for example, a video, picture, or document. Upon receiving file 111N, sync module 123 can sync module 103 can coordinate to propagate file 111N to computer system 101. Sync module 103 and sync module 133 can further coordinate to propagate file 111N to computer system 131.

Method 200 includes detecting that a copy of a file at the computer system contains inappropriate content (201). For example, in some embodiments, scan module 102 can scan file 111N. Scan module 102 can generate results 104 that indicate file 111N contains inappropriate content.

In other embodiments, sync module 103 and sync module 153 can coordinate to propagate file 111N to computer system 151 (as indicated by the dashed line). Scan module 152 can scan file 111N. Scan module 152 can generate results 154 that indicate file 111N contains inappropriate content. Computer system 151 can send results 154 to computer system 101 to make computer system 101 aware that file 111N contains inappropriate content. Scan module 152 can also delete file 111N in response to detecting that file 111N contains inappropriate content.

Method 200 includes coordinating with the one or more replicas to determine that another copy of the file is available at a replica, the replica being one of the plurality of replicas (202). For example, in some embodiments, in response to scan module 102 detecting that file 111N contains inappropriate content, scan module 102 can instruct sync module 103 to search for another (e.g., earlier or older) copy of file 111N. Sync module 103 can coordinate with sync modules 133, 143, and 153 to determine that file 111 is available at computer system 151. File 111 can be another (e.g., earlier or older) copy of file 111N.

In other embodiments, in response to scan module 152 detecting that file 111N contains inappropriate content, sync module 153 can determine that file 111 is another (e.g., earlier or older) copy of file 111N. Sync module 153 coordinate with sync module 103 to notify sync module 103 that file 111 is available at computer system 151.

Method 200 includes receiving an indication from the replica that the other copy of the file does not include inappropriate content (203). For example, computer system 101 can send request 161 to computer system 151. Request 161 can request an indication from computer system 151 that file 111 does not include inappropriate content. Computer system 151 can receive request 161 from computer system 101.

In response to receiving request 161 at computer system 151, scan module 152 can (re)scan file 111. Scan module 152 can determine that file 111 does not contain inappropriate content. Alternately or in combination, scan module 152 can refer to results from previous scans of file 111 to determine that file 111 does not contain inappropriate content. Computer system 151 can send indication 162 back to computer system 101. Indication 162 indicates that file 111 does not contain inappropriate content. Computer system 101 can receive indication 162 from computer system 151.

In other embodiments, computer system 151 sends indication 162 in response to detecting inappropriate content within a file (and without having received an express request from another computer system). For example, in response to detecting inappropriate content contained in file 111N, computer system 151 can determine that file 111 is another copy of file 111N. Computer system 151 can then scan file 111. When inappropriate content is not detected in file 111, computer system 151 can send indication 162 to computer system 101. In these other embodiments, based on detecting inappropriate content in a file received from computer system 101, computer system 151 essentially infers the appropriateness of making another clean copy of the file available to computer system 101.

Method 200 includes accessing the other copy of the file from the replica (204). For example, sync module 153 and sync module 103 can coordinate to propagate file 111 to computer system 101. Method 200 includes replacing the copy of the file with the other copy of the file at the computer system (205). For example, computer system 101 can replace file 111N with file 111. Thus, computer system 101 can use reverse replication to rollback file 111N to file 111.

Sync module 103 can then coordinate with other sync modules to propagate file 111 to other computer systems. For example, sync module 103 and sync module 123 can coordinate to propagate file 111 to computer system 121. Computer system 121 can replace file 111N with file 111.

Scan modules at different computer systems can have different capabilities. As depicted, scan module 132 includes repair function 137. Repair function 137 can include capabilities to remove specified types of malware, such as, viruses, from files.

Upon receiving file 111N at computer system 131, scan module 132 can also scan file 111N. Scan module 132 can generate results 134 that indicate file 111N contains inappropriate content. Scan module 132 can determine if the inappropriate content contained in file 111N is a type of inappropriate content repairable by repair function 137. If it is determined that file 111N contains a specified type of inappropriate content that repair function 137 can repair, scan module 132 can select either file repair or reverse replication as a mechanism to remove inappropriate content from file 111. When file 111N is repaired, sync module 133 can notify sync module 103 that a copy of file 111N that does not contain inappropriate content is available at computer system 131. This (clean) copy of file 111N can then be propagated to other computer systems. Alternately, reverse replication can be used to replace file 111N with file 111 at computer system 131.

Figure 3A:
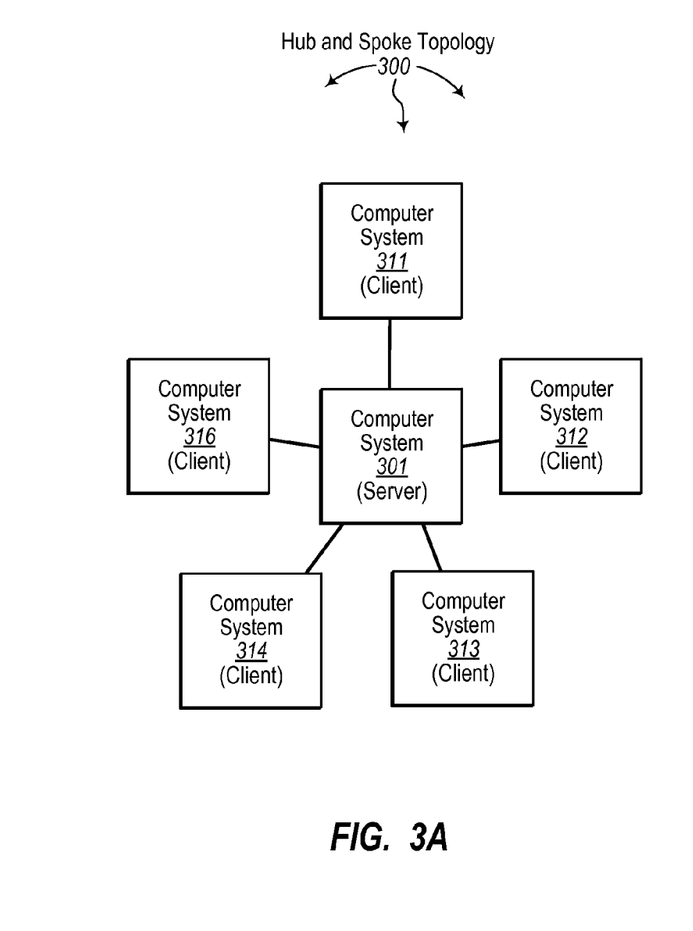
FIGS. 3A and 3B illustrate different network topologies for reverse replication to rollback infected files.

Embodiments of the invention can be implemented on a wide variety of network topologies. Turning now to FIG. 3A, FIG. 3A depicts hub and spoke topology 300. Embodiments of the invention can be implemented in hub and spoke topology 300.

As depicted in hub and spoke topology 300, computer systems 311, 312, 313, 314, and 316 are arranged as spokes around computer system 301 a hub. In hub and spoke topology 300, computer system 301 can be viewed as a server and computer systems 311, 312, 313, 314, and 316 can be viewed as clients. When a client computer system (e.g., any of computer systems 311, 312, 313, 314, and 316) sends a file to computer system 301, the file can be viewed as being uploaded from the client computer system to computer system 301. On the other hand when computer system 301 sends a file to a client computer system, the file can be viewed as being downloaded from the computer system 301 to the client computer system. Referring briefly to FIG. 1, computer system 101 can be a hub or server computer system and computer systems 121, 131, 141, and 151 can be spoke or client computer systems.

Figure 3B:
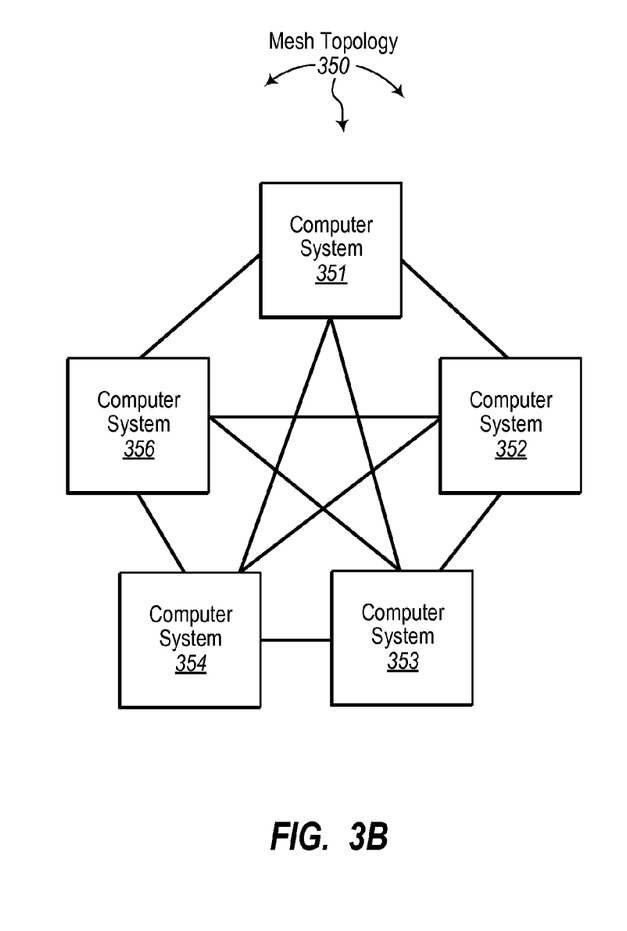

Turning now to FIG. 3B, FIG. 3B depicts mesh topology 350. Embodiments of the invention can be implemented in mesh topology 350. As depicted, mesh topology 350 includes computer systems 351, 352, 353, 354, and 356. Each of computer systems 351, 352, 353, 354, and 356 is connected to each of the other computer systems 351, 352, 353, 354, and 356 respectively. In mesh topology 350, each of computer systems 351, 352, 353, 354, and 356 can propagate files more directly to other computer systems 351, 352, 353, 354, and 356 in mesh topology 350.

Some embodiments of the invention use storage versioning as part of a rollback, facilitating prior version recognition rather than breaking a sync relationship. Storage version can also facilitate a potentially more iterative rollback in the event of latent detection of inappropriate content contained in a file. In these embodiments, a user can be prompted (e.g., by a user-interface control) 'do you want to rollback', possibly to 1 of n versions, or may be otherwise notified.

An alternate embodiment uses a hook that a scanning module is aware such that on detection the scanning module can flag to the system the presence of an inappropriate content. This awareness of the detection within an internal change notification can trigger rollback to a version of the file that does not have the flag set.

A further embodiment uses an appropriate synchronization mechanism, such as, for example, two way communications backed by a trust model based on attestation (or similar mechanisms). Using the appropriate synchronization mechanism, reverse replication facilitating file rollbacks can be achieved by a replicated storage system alone.

When inappropriate content is not damaging to legitimate content in a file, or when inappropriate content is contained in a non-data file, file repair (e.g., virus removal) may be a more appropriate mechanism to remove the inappropriate content. When one of these (or a similar) scenarios occur, a scanning module can bypass file rollback. Determining to bypass rollback can be based on a mix of active or passive participation by a scanning module in synchronization-aware storage transactions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for use at a computer system, the computer system including a processor and system memory, the method for reversing replication of a copy of a file at a replica included in a plurality of replicas, the method comprising the processor:

replicating a copy of a file that contains inappropriate content to the replica by receiving the copy of a file replicated from another replica, the other replica included in the plurality replicas, the copy of the file propagated to the replica in accordance with a synchronization protocol based at least on a change to the file at the other replica, the copy of the file overwriting an existing copy of the file;

coordinating with other of the plurality of replicas to determine that another copy of the file that does not contain inappropriate content is available at a further replica, the further replica included in the plurality of replicas; and rolling back the copy of the file to the other copy of the file to reverse replication of the replicated copy of the file by receiving the other copy of the file replicated from the further replica.

2. The method of claim 1, further comprising detecting that the copy of the file contains the inappropriate content, the inappropriate content including one of: a virus or data that is not permitted to leave the other replica.

3. The method of claim 1, further comprising replicating the other copy of the file to the other replica so that the other copy of the file can be used to rollback the copy of the file at the other replica.

4. The method of claim 1, wherein coordinating with other of the plurality of replicas to determine that another copy of the file is available at a further replica comprises participating in a synchronization handshake protocol with the further replica.

5. The method of claim 1, wherein coordinating with other the plurality of replicas to determine that another copy of the file is available at a further replica comprises determining that a plurality of earlier copies of the file, including the existing copy of the file, are available at the further replica;
further comprising selecting the existing copy of the file from among the plurality of earlier copies of the file; and
wherein rolling back the copy of the file to the other copy of the file comprises rolling back the copy of the file to the existing copy of the file.

6. The method of claim 5, further comprising presenting one or more user-interface controls at the computer system-prompting a user to select from among the available plurality of earlier copies of the file.

7. The method of claim 2, further comprising, based at least on detecting that the copy of the file contains inappropriate content, setting a flag for the copy of the file to indicate the presence of the inappropriate content; and
wherein receiving an indication from the further replica that the other copy of file does not include inappropriate content comprises receiving an indication from the further replica that the other copy of the file does not have the flag set.

8. The method of claim 1, wherein receiving the other copy of the file replicated from the further replica comprises replicating the other copy of the file from the further replica to the replica using the synchronization protocol.

9. The method claim 1, wherein the plurality of replicas form a replicated storage system by synchronizing files on an ongoing basis to maintain consistency between redundant resources.

10. The method of claim 9, wherein the plurality of replicas are connected to one another over a network, the network having one of: a hub and spoke topology or a mesh topology.

11. A computer program product for use at a computer system, the computer program product for implementing a method for reversing replication of a copy of a file at a replica included in a plurality of replicas, the computer program product comprising one or more computer storage devices having stored thereon computer-executable instructions that, when executed at a processor, cause the computer system to perform the method, including the following:
replicate a copy of a file that contains inappropriate content to the replica by receiving the copy of the file replicated from another replica included in the plurality of replicas, the copy of the file propagated to the replica in accordance with a synchronization protocol based at least on a change to the file at the other replica, the copy of the file overwriting an existing copy of the file;
coordinate with other of the plurality of replicas to determine that another copy of the file that does not contain inappropriate content is available at a further replica, the further replica included in teh plurality of replicas; and
rollback the copy of the file to the other copy of the file to reverse replication of the copy of the file by receiving the other copy of the file replicated from the further replica.

12. The computer program product of claim 11, further comprising computer-executable instructions that, when executed, cause the computer system to detect that the copy of the file contains the inappropriate content, the inappropriate content including one of: a virus or data that is not permitted to leave the other replica.

13. The computer program product of claim 11, further comprising computer-executable instructions that, when executed, cause the computer system to replicate the other copy of the file to the other replica so that the other copy of file can be used to rollback the copy of the file at the other replica.

14. The computer program product of claim 11, wherein computer-executable instructions that, when executed, cause the computer system to coordinate with other of the plurality of replicas to determine that another copy of the file is available at a further replica comprise computer-executable instructions that, when executed, cause the computer system to participate in a synchronization handshake protocol with the further replica.

15. The computer program product of claim 11, wherein computer-executable instructions that, when executed, cause the computer system to coordinate with other of the plurality of replicas to determine that another copy of the file is available at a further replica comprise computer-executable instructions that, when executed, cause the computer system to determine that a plurality of earlier copies of the file, including the existing copy of the file, are available at the further replica; and
further comprising computer-executable instructions that, when executed, cause the computer system to select the existing copy of the file from among the plurality of earlier copies of the file; and
wherein computer-executable instructions that, when executed, cause the computer system to roll back the copy of the file to the other copy of the file comprise computer-executable instructions that, when executed, cause the computer system to roll back the copy of the file to the existing copy of the file.

16. The computer program product of claim 15, further comprising computer-executable instructions that, when executed, cause the computer system to present one or more user-interface controls at the computer system prompting a user to select from among the available plurality of earlier copies of the file.

17. The computer program product of claim 12, further comprising computer-executable instructions that, when executed, cause the computer system to, based at least on detecting that the copy of the file contains inappropriate content, set a flag for the copy of the file to indicate the presence of the inappropriate content; and
wherein computer-executable instructions that, when executed, cause the computer system to receive an indication from the further replica that the other copy of file does not include inappropriate content comprise computer-executable instructions that, when executed, cause the computer system to receive an indication from the further replica that the other copy of the file does not have the flag set.

18. The computer program product of claim 11, wherein computer-executable instructions that, when executed, cause the computer system to receive the other copy of the file replicated from the further replica comprise computer-executable instructions that, when executed, cause the computer system to replicate the other copy of the file from the further replica to the replica using the synchronization protocol.

19. The computer program product claim 1, wherein the plurality of replicas form a replicated storage system for maintaining consistency between redundant resources and wherein the plurality of replicas are connected to one another over a network, the network having one of: a hub and spoke topology or a mesh topology.

20. A computer system, the computer system comprising:
one or more processors;
system memory coupled to the one or more processors, the system memory storing executable instructions;
the one or more processors configured to execute the executable instructions to:
maintain a replica included in a plurality of replicas;
replicate a copy of a file that contains inappropriate content to the replica by receiving the copy of the file replicated from another replica included in the plurality of replicas, the copy of the file propagated to the replica in accordance with a synchronization protocol based at least on a change to the file at the other replica, the copy of the file overwriting an existing copy of the file;
coordinate with other of the plurality of replicas to determine that another copy of the file that does not contain inappropriate content is available at a further replica, the further replica included in the plurality of replicas; and
rollback the copy of the file to the other copy of the file to reverse replication of the copy of the file by receiving the other copy of the file replicated from the further replica.

\* \* \* \* \*